United States Patent
Akelbein et al.

(10) Patent No.: US 7,926,045 B2
(45) Date of Patent: *Apr. 12, 2011

(54) ADAPTIVELY ASSIGNING OF DATA MANAGEMENT APPLICATIONS TO DATA OBJECTS

(75) Inventors: Jens-Peter Akelbein, Bodenheim (DE); Ute Schroefel, Salzkotten (DE)

(73) Assignee: International Business Machines Corporation, Armonk, NY (US)

( * ) Notice: Subject to any disclaimer, the term of this patent is extended or adjusted under 35 U.S.C. 154(b) by 529 days.

This patent is subject to a terminal disclaimer.

(21) Appl. No.: 11/968,832

(22) Filed: Jan. 3, 2008

(65) Prior Publication Data
US 2008/0104090 A1    May 1, 2008

Related U.S. Application Data

(63) Continuation of application No. 10/651,726, filed on Aug. 29, 2003, now Pat. No. 7,334,218.

(30) Foreign Application Priority Data

Sep. 2, 2002  (EP) .................................. 02019559

(51) Int. Cl.
G06F 9/44 (2006.01)
G06F 9/45 (2006.01)

(52) U.S. Cl. ........ 717/144; 717/101; 717/121; 717/122; 717/123; 717/166

(58) Field of Classification Search ........................ None
See application file for complete search history.

(56) References Cited

U.S. PATENT DOCUMENTS

| 7,065,744 B2 | 6/2006 | Barker et al. |
| 2005/0086239 A1 | 4/2005 | Swann et al. |

*Primary Examiner* — Chuck O Kendall
(74) *Attorney, Agent, or Firm* — Stephen B. Tkaca; Stephen J. Walder, Jr.; Jeffrey S. LeBaw

(57) ABSTRACT

A mechanism is provided for adaptively assigning of a plurality of data management application instances to a plurality of data objects. The mechanism determines a processing load for a plurality of data management application instances for performing a data management task based on history data being descriptive of the data objects which have been affected by previous data management tasks, each of the data management application instances being assigned to at least one sub-section of a tree being descriptive of a storage structure of the data objects by means of a set of separation points for each one of the data management application instances. The mechanism adapts the separation points in the tree for balancing the expected processing loads of the data management application instances for a future data management processing task.

20 Claims, 4 Drawing Sheets

ADAPTIVELY ASSIGNING OF DATA MANAGEMENT APPLICATIONS TO DATA OBJECTS

This application is a continuation of application number 10/651,726, filed Aug. 29, 2003 now U.S. Pat. No. 7,334,218, status allowed.

FIELD OF THE INVENTION

The present invention relates to the field of data management, and more particularly to distributed processing of data management tasks by a plurality of data management application instances (DM instances), such as for the purposes of data backup, restore, data migration, data recalls, and comparable data management tasks.

BACKGROUND AND PRIOR ART

The past years have shown that hard disk capacities are being doubled each year. Currently, no end to this trend is foreseeable and the amount of data being stored in some computing centres is growing even faster.

Looking to data stored on common file servers, both the number and the average size of data objects (files and folders) increase constantly. The amount of time needed to access a single data object is related to the average seek time to position the heads.

During the past two decades the duration of a single seek was reduced from 70 to a few milliseconds while the capacity of hard disk drives was multiplied by more than three orders of magnitude. Therefore, the duration of scanning through a whole file system extended over the time evidently because of the number of contained objects.

This trend affects the scalability of traditional data management solutions which require to scan all data objects i.e. by performing a full file system tree traversal. I.e. full or incremental backup solutions managing each file or folder as a single object require a scan of the whole file system tree. This might take several hours if millions of objects have to be processed leading to an unacceptable backup duration.

The amount of data to be backed up also grows constantly. Combining both trends leads to the conclusion that traditional data management tasks on a single file server will lead to an unacceptable processing time. Examples of such tasks are regular backups and restores with a predefined scope in a data protection system. For hierarchical storage management solutions (HSM) the operation of an automatic or threshold migration and recalls result in a scalability problem for a large set of data objects.

Several approaches are known to address the scalability problem of backups:

The first type of approach tries to avoid the scanning of objects at all.

By backing up images of logical volumes all data has to be transferred. No single object has to be scanned in this case, but all data blocks or at least the used ones need to be transferred.

An incremental image backup would remove the need to transfer all data. In this case, a new mechanism will be needed to detect the blocks which have been changed since the last backup. The inability of extracting a single data object out of an image is a major restriction on some operating systems. A solution would be an API provided by a file system to map logical block addresses to individual data forth and back.

Another approach is called journal-based backup. All file system activity is monitored to create a journal containing all changed objects so no scan is needed anymore to backup the incremental changes. This solution needs integration into the operating system to intercept all file system activities.

Microsoft Windows provides an API to implement such a solution while UNIX has a major lack in the design of the kernel. Inodes cannot be resolved back into file names without an additional translation table.

Furthermore, snapshot facilities allows the creation of an image of a file system which will not change anymore. The original data will remain online while a backup can be taken from the snapshot. Snapshot facilities shorten backup window for the online data to a few seconds while the snapshot is being created. The backup itself can be taken from the snapshot. Nevertheless, a snapshot does not reduce the time needed for an incremental backup.

Also parallelism in hardware and software can be used to reduce the time of a backups by splitting up the single task into several ones on independent data paths.

For client/server oriented backup solutions the hardware of both parts can exist as single or multiple instances of computing nodes and attached storage resources.

Since computing nodes are connected by m-to-n relationship via a LAN since decades, the advent of storage area networks (SAN) also brought the same interconnectivity to the connection between storage resources and computing nodes. Shared file systems allow today to access the same data object from multiple computing nodes. Storage networks (SN) based on Fibre Channel (SAN, IP storage, or other storage network hardware can be used today to share file systems.

If parallelism should be applied to a backup solution in such a shared environment the backup workload has to be split into a number of independent subtasks. Each subtask has to be assigned appropriately to a DM instance running on one of the computing nodes leading to a balanced distribution of the workload. If the separation into independent subtasks is successful, n computing nodes can backup the whole data in the 1/n-th amount of time.

FIG. 1 shows a block diagram of a prior art example of a data backup computer system where the data backup task is separated into sub tasks. The separation of the subtasks is performed manually by a system administrator:

The computer system has a storage system 100 comprising a number of file systems FS1, FS2, . . . , FSi, . . . . The storage system 100 is coupled via Storage Network (SN) 102 to a number of clients 1, 2 . . . , j, . . . . The clients 1, 2 . . . , j, . . . are coupled via a network 104 to DM application server 106, i.e. a Tivoli Storage Manager (TSM) server.

DM application server 106 is coupled to data repository 108. Data repository 108 serves as an archive for storing backups of the data. Furthermore, DM application server 106 has a list 110 which contains an entry for each of the clients 1, 2 . . . , j, . . . and assigns one or more of the file systems FS1, FS2, . . . , FSi . . . to each one of the clients. In other words the complete set of file systems contained in the storage system 100 is split up into sub-sets and each one of the sub-sets is assigned to one of the clients.

Furthermore, DM application server 106 has database 112 for storing the history of the incremental backups of the files contained in the file systems. In order to perform an incremental data backup the DM application server 106 reads list 110 and generates corresponding backup requests for the clients 1, 2 . . . , j, . . . .

For example DM application server 106 sends a backup request to client 1 over the network 104. The backup request contains an indication of those file systems which are assigned to client 1 in list 110. In response the client 1 performs the backup task for those file systems as specified in the backup request. The incremental backup data is stored back into data repository 108 for the purposes of archiving the data. Corresponding backup operations are performed by the other clients such that all file systems within the storage system 100 are backed up.

A disadvantage of this prior art system is that the assignment of clients to file systems is static and needs to be manually configured by a system administrator. This can result in a uneven distribution of the backup data processing workload between the clients. This means that system resources are not utilised in the most efficient way.

Further manual reconfiguration of the assignment of file systems to clients can be a tedious task, in particular when the number of file systems and clients is large.

It is therefore an object of the present invention to provide for an improved method for assigning of a plurality of DM instances to a plurality of data objects and a corresponding computer program product and computer system.

SUMMARY OF THE INVENTION

The object of the present invention is solved basically by applying the features as laid down in the independent claims. Preferred embodiments of the invention are set forth in the dependent claims.

In essence, the present invention enables to implement an autonomic data management solution without requiring manual interaction for the purpose of adjusting the configuration of DM application instances to balance their future processing workload.

The present invention provides for an improved balancing of a data management task such as a data protection or HSM task, between a plurality of data management applications. This is accomplished by dynamically adapting the assignment of data management applications to data objects, such as file systems or parts of file systems, i.e. folders, files, file extents, or other logical grouped data, based on the workload distribution of prior data processing tasks.

In accordance with a preferred embodiment of the invention one or more DM instances run on each computing node which build up the data management solution. The DM instances can have any purpose, such as data protection or HSM tasks.

In accordance with a further preferred embodiment of the invention the assignment of data management applications to file systems is done by setting separation points in the structure of a tree-organized set of data objects. A typical implementation of such a structure is a file system containing folders with subfolders and files consisting of file extents.

When a tree traversal is performed the separation points indicate sub-trees or regions which are assigned to specific ones of the data management applications. For example, if a separation point is assigned to folder A all its subfolders will belong to one region while the parent of folder A and all other data objects contained in this parent folder will belong to another region.

The workload distribution of past data management tasks is analysed and the separation points are modified in order to improve the balancing of the workload for future data management tasks. This way more efficient usage of the available system resources will be gained if the workload distribution in the future correlates with the distribution in the past. As a further advantage no manual interaction of a system administrator to reconfigure the system to the actual data processing needs is required.

In accordance with a further preferred embodiment of the invention the history data contains information about each data object in scope of the DM application. Examples of such information are the number of bytes being transferred to perform a data management task for a data object, the number of objects related to the object like the number of files being backed up in a folder.

This information is transformed by a calculation into a single numerical value which reflects the resulting workload to perform data management tasks on the data object in the past. The value can represent different goals of workload distribution like an equal number of bytes being backed up by each DM instance or the same amount of time to perform the data management tasks by all DM instances.

The goal of separation and other parameters needed for the computations can be seen as the configuration of the adaptation program. A separation of the tree of data objects into appropriate regions requires the numerical values to perform an appropriate calculation to generate an appropriate set of separation points. It is preferred that all history data is available before the data management task takes place to generate the set of separation points before the data management task starts.

BRIEF DESCRIPTION OF THE DRAWINGS

In the following a preferred embodiment of the invention is described in greater detail by making reference to the drawings in which.

DETAILED DESCRIPTION

Figure 2:
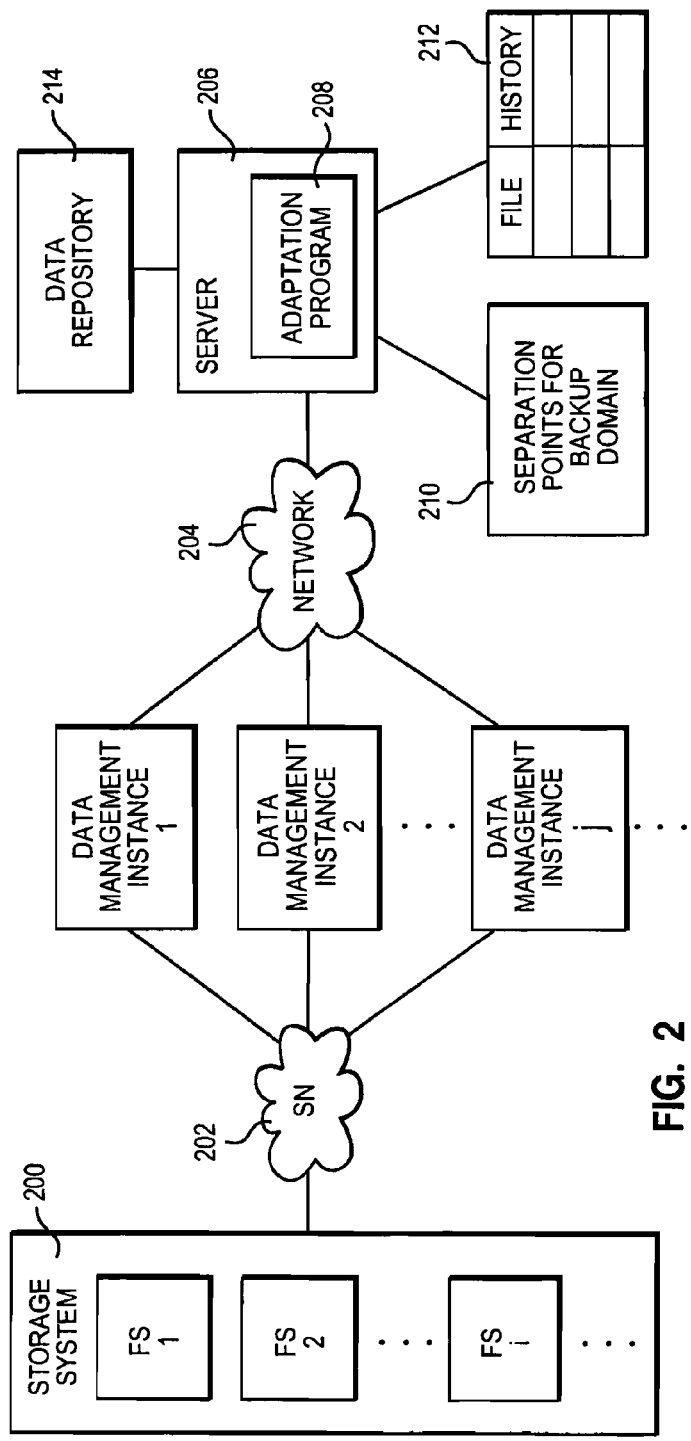
FIG. 2 is a block diagram of an embodiment of a computer system of the invention with dynamic workload balancing.

FIG. 2 shows a computer system having a storage system 200. The storage system comprises a number of file systems FS1, FS2 . . . , FSi . . . containing folders and files. All file systems FS1, FS2 . . . , FSi . . . are in scope to be backed up so they build up a backup domain of a DM application. A number of DM instances 1, 2 . . . , j . . . are coupled by means of storage network SN 202 to storage system 200 to perform the backup of the backup domain.

In the example considered here the DM instances build up a data backup application. However it is important to note that the present invention is not limited to data backup applications but can also be applied to a variety of other data management tasks, such as data migration, restore, data recalls, and comparable data management tasks.

The DM instances 1, 2 . . . , j . . . are coupled via network 204 to server 206. Server 206 has an adaptation program 208 which performs the separation of the workload balancing. The workload balancing is performed by means of the backup domain 210 which is descriptive of the file system, folder, and file tree-organized structure of storage system 200. By means of separation points the tree is split up into regions, where each of the regions is assigned to only one of the data management applications.

Figure 1:
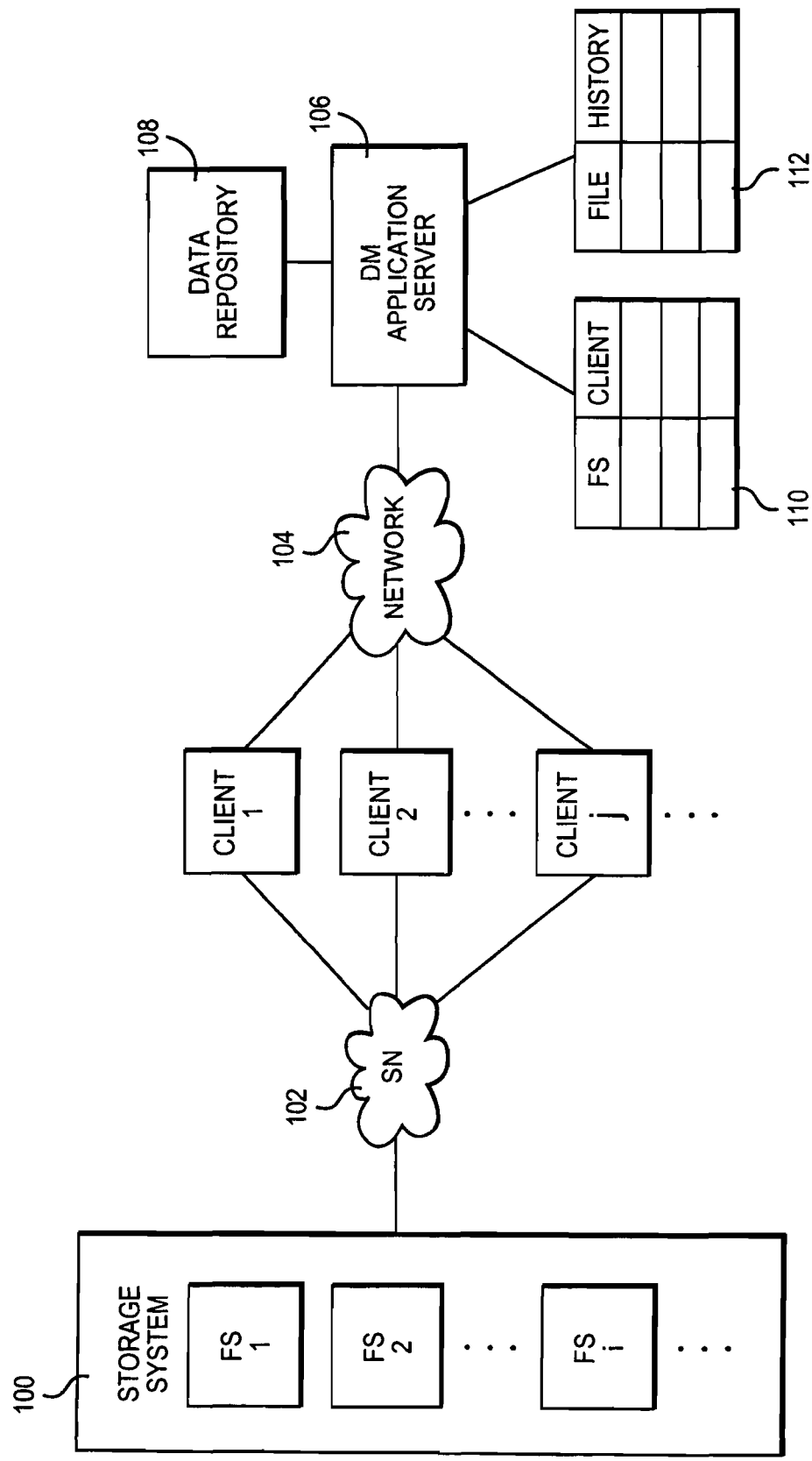
FIG. 1 is a block diagram of a prior art computer system for performing a data backup task.

Further the server 206 is coupled to database 212. Database 212 serves to store data being indicative of the incremental backup operations which have been performed on the individual files contained in the storage system 200 previously. The structure of the database 212 can be the same as of database 112 (cf. FIG. 1).

Further the server 206 is coupled to data repository 214 which serves to store the backed up data.

In operation the assignment file system, folders, and files comprised in the storage system 200 to data management applications is read out from the information about the backup domain 210 as indicated by the separation points contained in the backup domain 210. The server 206 generates corresponding data backup requests for each one of the data management applications. The performance of the data backup operation of each one of the data management applications is tracked by means of database 212.

Adaptation program 208 analyses database 212 to assess the distribution of the workload between the DM instances. The past workload distribution is an input for the adaptation method performed by the adaptation program 20B.

When the adaptation program 208 determines that the distribution of the workload between the DM instances is uneven the separation of the backup domain 210 is adapted by shifting, erasing or creating separation points. This is done by inputting corresponding data from adaptation program 208 to the backup domain 210 in order to adapt the backup domain to the modified assignment of data objects to data management applications as determined by the adaptation program 208.

It is to be noted that the data management program does not necessarily need to reside on server 206 but can be implemented by means of a separate component which is coupled to server 206.

By extending the representation of a separation point from a path name to a path name and logical extent information or logical block addresses optionally parts of large files can also be assigned to different regions.

Figure 3:
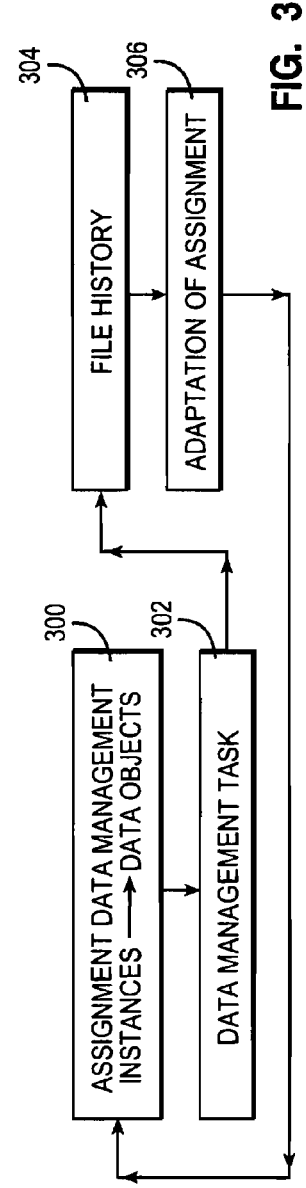
FIG. 3 is a flow chart being illustrative of the adaptive assignment of DM instances to parts of a shared storage like file systems.

FIG. 3 shows a corresponding flow chart. In step 300 an assignment of DM instances to data objects, such as file systems and/or files is performed. In the preferred embodiment considered here this is done by means of a tree traversal whereby the separation points comprised within the tree define sub-trees containing subsets of file systems and/or data objects to be backed up by a particular one of the DM instances.

In step 302 the data management task is performed. In step 304 the history database is updated in order to reflect which ones of the data objects have required an incremental backup. This information indirectly indicates the distribution of the workload between the DM instances. Depending on the implementation if the DM application step 302 and 304 can also be performed in an interleaved way.

In step 306 the assignment of data management applications to file systems and/or data objects is adapted for the purpose of improving the balancing of the workload between the DM instances. An exact result of this separation will result in an exponential amount of time for the computations depending on the number of data objects. A preferred embodiment will determine this adaptation by an iterative approximation in order to adapt the assignment of DM instances in a reasonable amount of time. By defining an allowed tolerance for the goal, the expected workload of each DM instance might deviate individually in a range.

If all DM instances are within this range the iterative approximation stops and the current result will become the separation. To limit the number of needed separation points the approximation will start on the top level of whole file systems and split them into smaller sub-trees as needed with each step of the separation. For restoring data in a data protection solution a predefined scope of the restore avoids to compute the separation lists as part of the restore operation.

Figure 4:
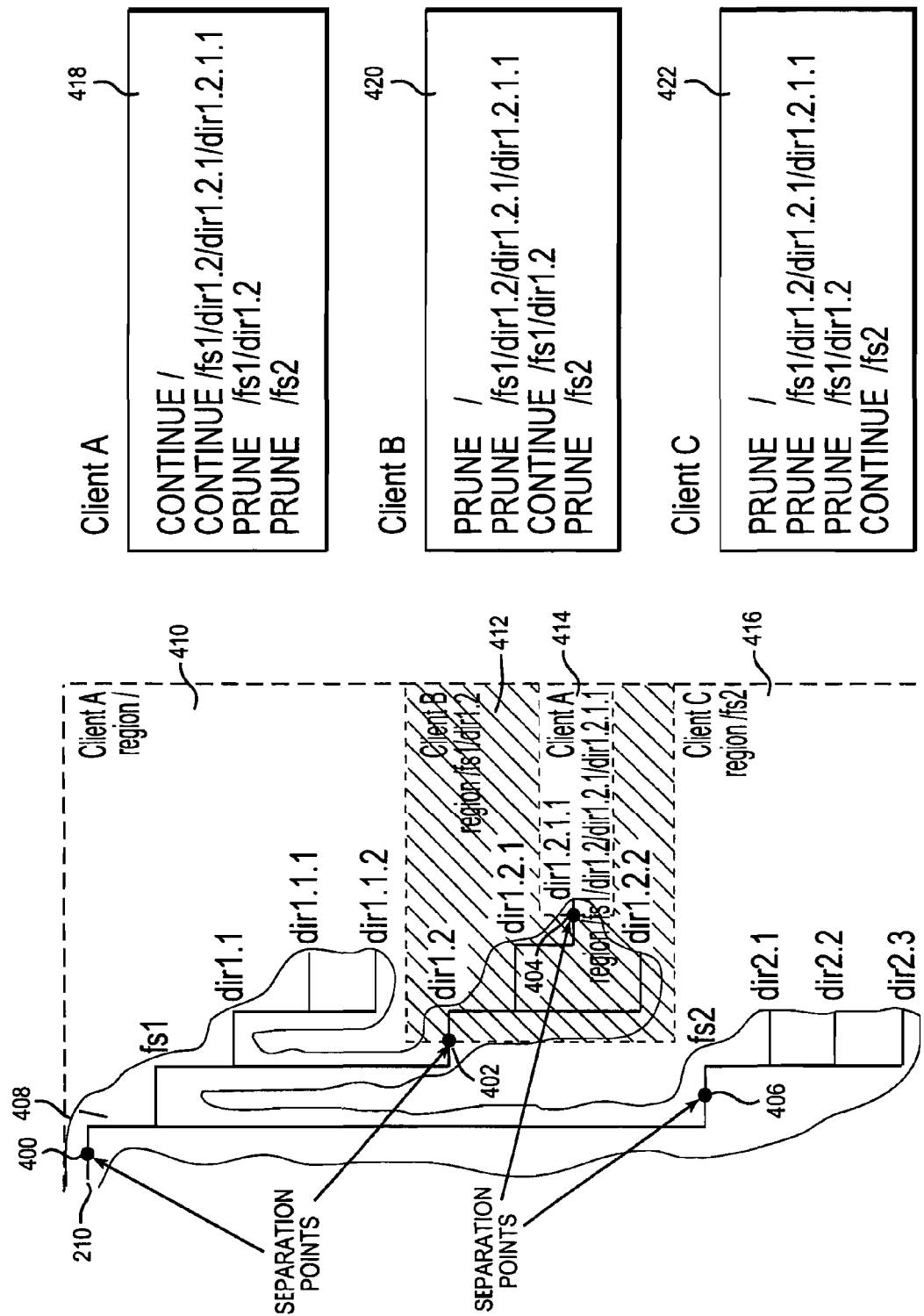
FIG. 4 is illustrative of the separation of a file system tree into sub-trees.

FIG. 4 shows an example of a backup domain 210 (cf. FIG. 2) consisting of two file systems 424 and 426. Backup domain 210 contains separation points 400, 402, 404 and 406. Each one of the separation points 400 to 406 is assigned to one of the DM instances. By assigning a separation point to a DM instance only this instance will traverse the sub-tree within the region separated by the separation point from the remaining part of the backup domain.

For example separation point 400 is assigned to DM instance client A. Separation point 402 is assigned to DM instance client B, separation point 404 is assigned to DM instance client A and separation point 406 is assigned to SM instance client C. DM instances client A, B, and C run on three computing nodes to perform parallel backups.

When a full tree traversal 408 is made the sub-trees (regions) 410, 412, 414 and 416 are traversed. Those sub-trees indicate the files or folders which are to be processed by a specific one of the DM instances. A full tree traversal is avoided because the DM instances will traverse their assigned sub-trees only.

Preferably the information contained in the separation points 400 to 406 is stored by means of lists 418 to 422 (separation lists). The assignment of a separation point to a DM instance has to be reflected in a command which is evaluated by the DM instance. In this example the command 'continue' is used to represent this relationship.

Furthermore, all other DM instances need to know that they do not have to traverse the sub-tree beneath the separation point. Therefore, this example uses a command 'prune' to indicate the stop of a tree traversal at the separation point for DM instances. Both commands 'continue' and 'prune' are followed by a path name representing the separation point.

The separation of the backup domain 210 is performed by shifting, deleting and/or creating one or more separation points in order to change the assignment of DM instances to regions for the purpose of balancing the workload. Preferably the workload balancing is performed by adaptation program 208 (cf. FIG. 2) with a goal to balance the duration for a backup operation the amount of data backed up by each DM instance.

Figure 5:
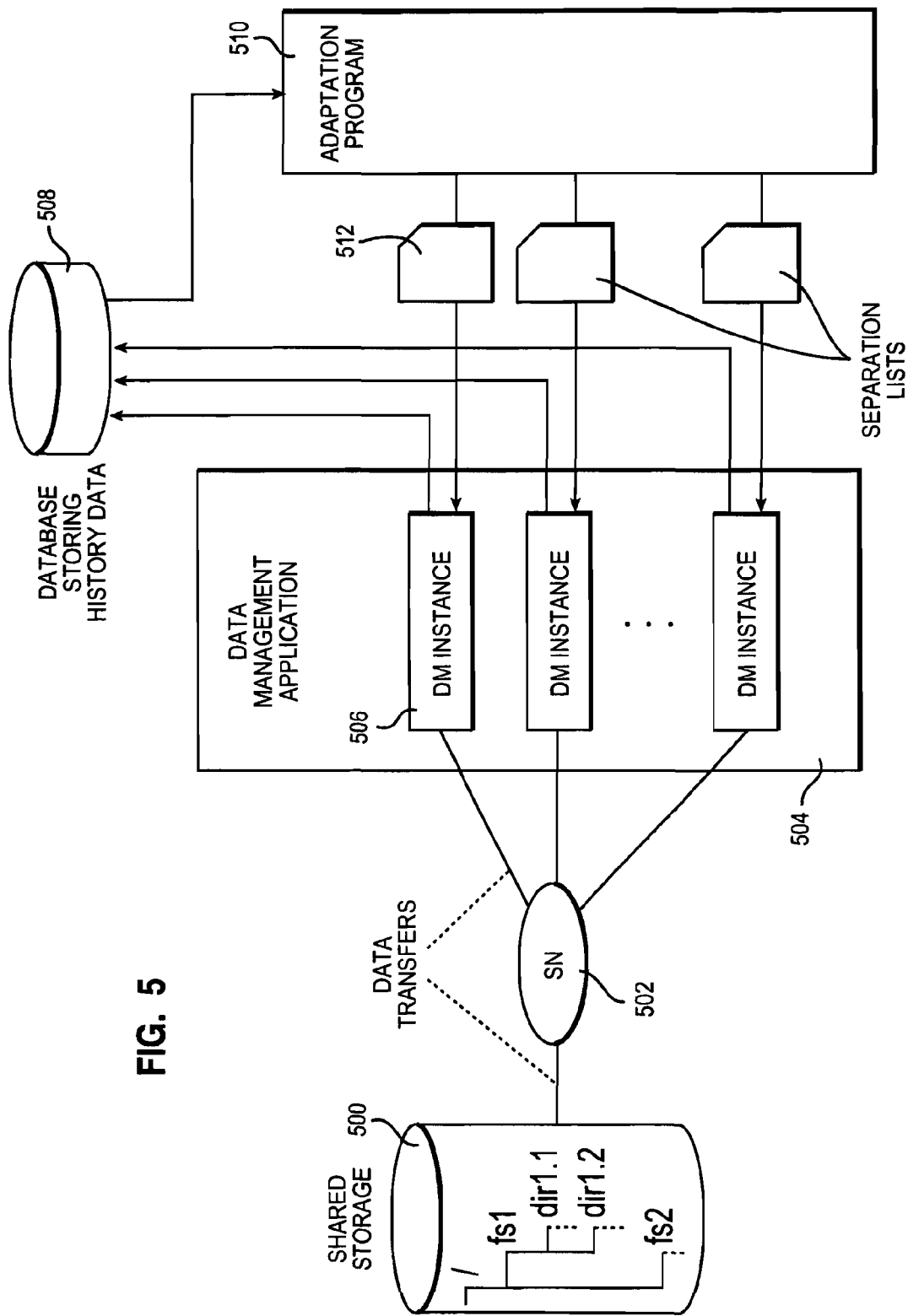
FIG. 5 is a block diagram of an alternative embodiment of a computer system of the invention.

FIG. 5 shows an alternative embodiment. The computer system of this embodiment has a shared storage system 500 which is coupled via storage network SN 502 to data management instances 504 comprising a number of data management (DM) instances 506. The data management instances 506 are coupled to database 508 for storing historical information on the performance of previous data management tasks. The database 508 is coupled to the adaptation program 510 which generates separation lists 512. Each of the separation lists 512 is assigned to one of the data management instances 506 and specifies the folders and/or files to be processed by the assigned data management instance 506.

The separation lists 512 are generated by the adaptation program based on the history data provided by database 508 in order to balance the processing workload of the data management instances 506.

It is to be noted that a tree traversal is not always required. For example a data recall does not require a tree traversal, even not a partial tree traversal.

LIST OF REFERENCE NUMERALS storage system 100
SN 102
network 104
DM application server 106
data repository 108
list 110
database 112
storage system 200
SN 202
server 206
adaptation program 208
backup domain 210
database 212
data repository 214
separation point 400
separation point 402
separation point 402
separation point 406
tree traversal 408
sub-tree 410
sub-tree 412
sub-tree 414
sub-tree 416
list 418
list 420
list 422
shared storage system 500
SN 502
DM application 504
DM instance 506
database 508
adaptation 510
separation list 512

The invention claimed is:

1. A computer program product in a computer readable medium having a computer readable program, for adaptively assigning of a plurality of data management application instances to a plurality of data objects wherein the computer readable program, when executed on a computing device, causes the computing device to:
   determine a processing load for a plurality of data management application instances for performing a data management task based on history data being descriptive of the data objects which have been affected by previous data management tasks, each of the data management application instances being assigned to at least one sub-section of a tree being descriptive of a storage structure of the data objects by means of a set of separation points for each one of the data management application instances; and
   adapt the separation points in the tree for balancing the expected processing loads of the data management application instances for a future data management processing task.

2. The computer program product of claim 1, wherein identification of the sub-sections in the tree comprises a full tree traversal of a sub-section, a partial tree traversal of a sub-section, or direct access to a data object without a tree traversal.

3. A computer system comprising:
   means for storing data being descriptive of a tree being descriptive of a storage structure of the data objects;
   means for storing sets of separation points for each of the data management application instances, each set of separation points defining at least one sub-section of the tree which is assigned to the corresponding data management application instances to perform a data management task;
   means for storage of history data being descriptive of the data objects which have been affected by previous data management tasks; and
   means for determining a processing load for each of the data management application instances based on the history data and for adapting the separation points in the tree for the balancing of the loads of the data management applications instances.

4. The computer program product of claim 1, wherein the data management task is a data backup, restore, data migration, or data recall.

5. The computer program product of claim 1, whereby one or more sub-sections of the tree are assigned to data files or folders by a tree traversal.

6. The computer program product of claim 1, wherein the computer readable program, when executed on a computing device, further causes the computing device to store the separation points as a corresponding path indication in the tree.

7. The computer program product of claim 1, wherein the data management application instances execute on one or more computing nodes to perform the data management task on corresponding sub-sections of the tree structure.

8. The computer program product of claim 7, wherein the data objects are stored in one or more file systems in a storage system.

9. The computer program product of claim 8, wherein the storage system is connected to the one or more computing nodes via a storage area network.

10. The computer program product of claim 7, wherein the computing device is a data management server.

11. The computer program product of claim 10, wherein the one or more computing nodes are connected to the data management server via a network.

12. The computer program product of claim 11, wherein the data management task is a data backup task and wherein each data management application instance copies a corresponding sub-section of the tree structure to a backup data repository connected to the data management server.

13. The computer system of claim 3, wherein the data management application instances execute on one or more computing nodes to perform the data management task on corresponding sub-sections of the tree structure.

14. The computer system of claim 13, wherein the data objects are stored in one or more file systems in a storage system and wherein the storage system is connected to the one or more computing nodes via a storage area network.

15. The computer system of claim 13, wherein the computer system is a data management server and wherein the one or more computing nodes are connected to the data management server via a network.

16. A computer system, comprising:
   a processor; and
   a memory coupled to the processor, wherein the memory contains instructions which, when executed by the processor, cause the processor to:
   determine a processing load for a plurality of data management application instances for performing a data management task based on history data being descriptive of the data objects which have been affected by previous data management tasks, each of the data management application instances being assigned to at least one sub-section of a tree being descriptive of a storage structure of the data objects by means of a set of separation points for each one of the data management application instances; and adapt the separation points in the tree for balancing the expected processing loads of the data management application instances for a future data management processing task.

17. The computer system of claim 16, wherein identification of the sub-sections in the tree comprises a full tree traversal of a sub-section, a partial tree traversal of a sub-section, or direct access to a data object without a tree traversal.

18. The computer system of claim 16, wherein the data management task is a data backup, restore, data migration, or data recall.

19. The computer system of claim 16, whereby one or more sub-sections of the tree are assigned to data files or folders by a tree traversal.

20. The computer system of claim 16, wherein the instructions further causes the processor to store the separation points as a corresponding path indication in the tree.

* * * * *